(12) United States Patent
Vitale et al.

(10) Patent No.: US 8,262,313 B2
(45) Date of Patent: Sep. 11, 2012

(54) METHOD AND COMPOSITION FOR ROAD CONSTRUCTION AND SURFACING

(75) Inventors: Robert W. Vitale, Canton, OH (US); Frank D. Elswick, Santa Maria, CA (US); Gina M. Greenlee, Canton, OH (US)

(73) Assignee: Midwest Industrial Supply, Inc., Canton, OH (US)

( * ) Notice: Subject to any disclaimer, the term of this patent is extended or adjusted under 35 U.S.C. 154(b) by 0 days.

(21) Appl. No.: 13/360,774

(22) Filed: Jan. 29, 2012

(65) Prior Publication Data

US 2012/0129983 A1 May 24, 2012

Related U.S. Application Data

(66) Continuation of application No. 13/102,213, filed on May 6, 2011, now Pat. No. 8,104,991, Substitute for application No. 61/332,479, filed on May 7, 2010.

(60) Provisional application No. 61/379,570, filed on Sep. 2, 2010.

(51) Int. Cl.
*C08F 283/04* (2006.01)
(52) U.S. Cl. .................. 404/76; 404/75; 252/88.1
(58) Field of Classification Search .......... 404/17, 404/31, 72, 75, 76; 252/88.1
See application file for complete search history.

(56) References Cited

U.S. PATENT DOCUMENTS

| | | | |
|---|---|---|---|
| 3,640,696 A | 2/1972 | Goldmann | |
| 3,651,649 A | 3/1972 | Najvar et al. | |
| 3,690,107 A | 9/1972 | Dolfing et al. | |
| 3,705,467 A | 12/1972 | McKnight | |
| 3,887,506 A | 6/1975 | Hewitt | |
| 4,106,296 A | 8/1978 | Leonard, Jr. et al. | |
| 4,129,435 A | 12/1978 | Takematsu et al. | |
| 4,218,234 A | 8/1980 | Nadasy et al. | |
| 4,252,556 A | 2/1981 | Nadasy et al. | |
| 4,268,428 A | 5/1981 | Green | |
| 4,417,992 A | 11/1983 | Bhattacharyya et al. | |
| 4,592,931 A | 6/1986 | Cargle | |
| 4,650,820 A | 3/1987 | Decroix | |
| 4,822,425 A | 4/1989 | Burch | |
| 5,013,349 A | 5/1991 | Tanaka | |
| 5,082,500 A | 1/1992 | Nachtman et al. | |
| 5,112,902 A | 5/1992 | Moriya et al. | |
| 5,178,668 A | 1/1993 | Traver et al. | |
| 5,595,782 A | 1/1997 | Cole | |

(Continued)

FOREIGN PATENT DOCUMENTS

EP    0 467 073    1/1992

(Continued)

OTHER PUBLICATIONS

Rohmax Additives GmbH, "Viscoplex 1-180," Data Sheet, Jul. 2004, www.rohmax.com.

(Continued)

*Primary Examiner* — Raymond W Addie
(74) *Attorney, Agent, or Firm* — Daniel A. Thomson; Emerson Thomson Bennett, LLC

(57) ABSTRACT

Methods and compositions for improving the strength and longevity of secondary roadways through environmentally sound practices are disclosed herein. A composition for road sealing includes an aqueous emulsion of acrylic and vinyl acetate polymer, water, and a resin-modified emulsion, wherein the resin-modified emulsion includes a mixture of pitch and rosin, an emulsifying agent, and water.

20 Claims, 3 Drawing Sheets

U.S. PATENT DOCUMENTS

| Patent No. | Date | Inventor |
|---|---|---|
| 5,648,116 A | 7/1997 | Roe et al. |
| 5,712,316 A | 1/1998 | Dahmen et al. |
| 5,733,576 A | 3/1998 | Chmelir |
| 5,824,725 A | 10/1998 | Lahalih |
| 5,846,601 A | 12/1998 | Ritter et al. |
| 5,860,770 A | 1/1999 | Hunt |
| 5,997,599 A | 12/1999 | Wommack et al. |
| 6,060,557 A | 5/2000 | Dahmen et al. |
| 6,076,997 A | 6/2000 | First et al. |
| 6,132,638 A | 10/2000 | Oldenhove |
| 6,325,836 B1 | 12/2001 | Wommack et al. |
| 6,349,499 B1 | 2/2002 | Spittle |
| 6,403,700 B1 | 6/2002 | Dahmen et al. |
| 6,503,521 B1 | 1/2003 | Atis |
| 6,695,545 B2 | 2/2004 | Boston |
| 6,729,805 B2 | 5/2004 | Wathen |
| 6,750,262 B1 | 6/2004 | Hahnle et al. |
| 6,759,453 B2 | 7/2004 | Jelling et al. |
| 6,982,291 B2 | 1/2006 | Desin |
| 7,001,444 B2 | 2/2006 | Small |
| 7,026,390 B2 | 4/2006 | O'Brien-Bernini et al. |
| 7,070,709 B2 | 7/2006 | Schilling et al. |
| 7,074,266 B2 | 7/2006 | Hawkins et al. |
| 7,134,806 B2 | 11/2006 | Lazic |
| 7,207,744 B2 | 4/2007 | Jones, IV et al. |
| 7,285,515 B2 | 10/2007 | Goncalves et al. |
| 7,514,018 B2 | 4/2009 | Schilling et al. |
| 7,651,294 B2 | 1/2010 | Maier |
| 8,033,750 B2 | 10/2011 | Vitale |
| 8,048,333 B2 | 11/2011 | Vitale et al. |
| 8,066,448 B2 | 11/2011 | Vitale et al. |
| 8,070,383 B2 | 12/2011 | Vitale et al. |
| 8,070,384 B1 | 12/2011 | Vitale et al. |
| 8,070,979 B2 | 12/2011 | Vitale et al. |
| 8,070,980 B2 | 12/2011 | Vitale et al. |
| 8,104,991 B2 | 1/2012 | Vitale et al. |
| 8,132,982 B2 | 3/2012 | Vitale et al. |
| 2004/0011102 A1 | 1/2004 | Sears |
| 2004/0035162 A1 | 2/2004 | Williams et al. |
| 2004/0074271 A1 | 4/2004 | Krysiak et al. |
| 2004/0234682 A1 | 11/2004 | Hawkins et al. |
| 2004/0245494 A1 | 12/2004 | Horman et al. |
| 2004/0260017 A1 | 12/2004 | Mertens et al. |
| 2005/0090401 A1 | 4/2005 | Sakane et al. |
| 2005/0124527 A1 | 6/2005 | Hawkins et al. |
| 2005/0150417 A1 | 7/2005 | Hirsbrunner et al. |
| 2006/0020058 A1 | 1/2006 | Grawe et al. |
| 2006/0048670 A1* | 3/2006 | Al-Rashed .......... 106/2 |
| 2006/0075928 A1* | 4/2006 | Richards et al. ........ 106/286.1 |
| 2006/0128839 A1 | 6/2006 | Ferrall et al. |
| 2006/0156961 A1 | 7/2006 | Langford |
| 2007/0037925 A1 | 2/2007 | Weitzel et al. |
| 2007/0135561 A1 | 6/2007 | Rath et al. |
| 2007/0286903 A1 | 12/2007 | Becicka |
| 2008/0028890 A1 | 2/2008 | Hey et al. |
| 2008/0038470 A1 | 2/2008 | Hagens et al. |
| 2008/0087305 A1 | 4/2008 | Cotter |
| 2008/0185160 A1 | 8/2008 | Diener et al. |
| 2009/0090890 A1 | 4/2009 | Nguyen |
| 2009/0169901 A1 | 7/2009 | Blacklidge |
| 2009/0189113 A1* | 7/2009 | Lamperd et al. .......... 252/88.1 |
| 2009/0211491 A1 | 8/2009 | Ogata et al. |
| 2009/0301302 A1 | 12/2009 | Weatherman et al. |
| 2009/0301863 A1 | 12/2009 | Swanson, Jr. et al. |
| 2009/0318602 A1* | 12/2009 | Deneuvillers ........ 524/425 |
| 2010/0047015 A1 | 2/2010 | Takamura et al. |
| 2010/0075029 A1* | 3/2010 | Wilson, Jr. ........ 427/138 |
| 2010/0112329 A1 | 5/2010 | Yi |

FOREIGN PATENT DOCUMENTS

| Country | Number | Date |
|---|---|---|
| EP | 1 112 324 | 10/2005 |
| EP | 2 083 121 | 7/2009 |
| GB | 2 142 552 | 1/1985 |
| JP | 49 7899 | 2/1974 |
| JP | 04 142390 | 5/1992 |
| JP | 07 042210 | 5/1995 |
| JP | 2109781 | 11/1996 |
| KR | 10 2000 0060661 | 10/2000 |
| WO | 00 15715 | 3/2000 |
| WO | 02 02715 | 1/2002 |
| WO | 2006 041581 | 4/2006 |
| WO | 2006 063159 | 6/2006 |
| WO | 2006 068467 | 6/2006 |
| WO | 2007 146317 | 12/2007 |
| WO | 2008 011368 | 1/2008 |
| WO | 2008 070234 | 6/2008 |
| WO | 2009 137299 | 11/2009 |
| WO | 2010 025518 | 3/2010 |

OTHER PUBLICATIONS

Rohmax Additives GmbH, "Viscoplex 10-131," Data Sheet, Jul. 2004, www.rohmax.com.

Midwest Industrial Supply, Inc., "Envirokleen Gravel Runways Fines Preservation," unknown publication, unknown date, www.midwestind.com.

Midwest Industrial Supply, Inc., "EK35 Gravel Runways Fines Preservation," unknown publication, unknown date, www.midwestind.com.

Geotechnical Laboratory of Advanced Geotechnical Testing AGT, LLC, "Kipnik Soil Evaluation Stabilized Sub-Grade Apron Development," AGT Project No. 3407159, Sep. 2007.

University of Alaska Fairbanks, Hazirbaba, Connor, Davis, Zhang, "Final Report: The Use of Geofiber and Synthetic Fluid for Stabilizing Marginal Soils," INE Project No. RR07.03, Oct. 1, 2007.

Tracey, Tsou, "Dynamically Vulcanized Alloy Innerliners," Rubber World Magazine, ISSN 0035-9572, Sep. 1, 2007.

University of Alaska Fairbanks, Misc. Authors, Newsletter vol. 1, No. 2, Feb. 2008.

Wacker Silicones, "Drysoil in Landscaping Application, Creating Tomorrow's Solutions," Apr. 1, 2008.

Copeland, Eisele, Chesney, Kawatra, "Factors Influencing Dust Suppressant Effectiveness," Minerals & Metallurgical Processing, 25(4): 215-222, Nov. 2008.

Kavouras, Etyemezian, Nikolich, Gilles, Sweeney, Young, Shafer, "A New Technique for Characterizing the Efficacy of Fugitive Dust Suppressants," Journal of the Air & Waste Management Association, 59(5): 603-612, May 2009.

Edvardsson, "Gravel Roads and Dust Suppression," Road Materials and Pavement Design, 10(3): 439-469, Jul.-Sep. 2009.

Goodrich, Koski, Jacobi, "Monitoring Surface Water Chemistry Near Magnesium Chloride Dust Suppressant Treated Roads in Colorado," Journal of Environmental Quality, 38(6): 2373-2381, Nov.-Dec. 2009.

Marais, Thompson, Visser, "Managing Mine Road Maintenance Interventions Using Mine Truck On-Board Data," The Southern African Institute of Mining and Metallurgy, Surface Mining 2008.

Thompson, Visser, "Mine Haul Road Maintenance Management Systems," unknown publication, unknown date.

Thompson, Visser, Van Den Bert, Bosch, "Towards a Mechanistic Structural Design Method for Surface Mine Haul Roads," Journal of the South African Institution of Civil Engineers, vol. 38, No. 2, Second Quarter 1996, pp. 13-21.

Thompson, Visser, "Mine Haul Road Fugitive Dust Emission and Exposure Characterisation," unknown publication, Jan. 2001.

Thompson, Visser, "Benchmarking and Managing Surface Mine Haul Road Fugitive Dust Emissions," unknown publication, Mar. 2002.

Hugo, Heyns, Thompson, Visser, "Haul Road Condition Monitoring using Vehicle Response Measurements," ICSV, Jul. 2005.

Thompson, Visser, "The Impact of Rolling Resistance on Fuel, Speed and Costs," HME 2006: Continuous Improvement Case Studies, 2006.

Thompson, Visser, "Selection and Maintenance of Mine Haul Road Wearing Course Materials," Mining Technology, 2006, vol. 115, No. 4, pp. 140-153.

Thompson, Visser, "Selection Performance and Economic Evaluation of Dust Palliatives on Surface Mine Haul Roads," The Journal of the Southern African Institute of Mining and Metallurgy, vol. 107, Jul. 2007, pp. 1-16.

Thompson, Visser, "Final Project Report COL467: The Reduction of the Safety and Health Risk Associated with the Generation of Dust on Strip Coal Mine Haul Roads," University Pretoria, Departments of Mining and Civil Engineering, Jan. 2000.

Edil, Benson, "Sustainable Construction Case History: Fly Ash Stabilization of Road-Surface Gravel," University of Wisconsin-Madison, Geological Engineering Program, Dept. of Civil and Environmental Engineering, 2007 World of Coal Ash (WOCA), May 7-10, 2007.

Liu, J., Shi,B.,Jiang, H., Bae, S., Huang, H., "Improvement of Water-Stability of Clay Aggregates Admixed with Aqueous Polymer Soil Stabilizers" Catena, vol. 77, Issue 3, Jun. 15, 2009, p. 175-179.

Collins, R.W., "Stabilization of Marginal Soils using GeoFibers and NonTraditional Additives" Thesis presented to Faculty of University of Alaska Fairbanks, Fairbanks, Alaska, Aug. 2011, 109 Pages.

* cited by examiner

METHOD AND COMPOSITION FOR ROAD CONSTRUCTION AND SURFACING

This application is a continuation of U.S. Ser. No. 13/102,213, filed May 6, 2011, now U.S. Pat. No. 8,104,991, which claims priority to a provisional patent application Ser. No. 61/332,479, filed May 7, 2010, and Ser. No. 61/379,570, filed Sep. 2, 2010, the contents of which are hereby incorporated by reference. This invention generally relates to methods and compositions for improving the strength and longevity of secondary roadways through environmentally sound practices.

I. BACKGROUND

A. Field

B. Description of the Related Art

The engineering and construction of secondary roads (hereafter, "gravel roads," "earth roads," or "unpaved roads") has been perpetually plagued by two interrelated problems: the deterioration of the road due to water, and the loss of surface cohesion and road compaction due to traffic. The deleterious effects of water on roadways, in particular, are well documented in the prior art. In cold weather, moisture that penetrates a road's base layers freezes and rips cracks into the road substrate that seriously undermine the load bearing capacity and longevity of the roadway. Likewise, in milder weather, when water seeps into the road's base layers it results in softening and erosion that causes potholes that are an expensive and recurring problem. And if the potholes are not immediately repaired, they fill with water and further exacerbate the deterioration of the roadway.

The impact of water on secondary roads—such as rural roads, access roads, field and forestry roads, or mountain roads—is especially pronounced because the quality of the surfacing materials is lower than in an asphalt paved road, for example, and thus provides reduced surface protection from the elements. Additionally, because of capillary action, water also seeps into the road base from the sides and bottom of the road's base or sub-base. Compared to sealed or "paved" roads, which require large machinery to pour concrete or to lay and smooth a bitumen-based surface, secondary unpaved roads are relatively easy and inexpensive to build. But unpaved roads require much more frequent maintenance—particularly after wet periods or when faced with increased traffic—and are generally prone to other problems not associated with paved roads.

For example, many secondary roads—of either an earth or gravel variety—utilize native soils, often in conjunction with gravel quarried from local resources, to create the road's sub-base and base layers. Unfortunately, native soils and gravel are not always of suitable quality, resulting in a road base with diminished physical and mechanical properties. When secondary roads are constructed of poor road base materials, routine maintenance is not strictly employed, and the road is exposed to heavy moisture and/or traffic, the erosion of the road—due to damage to the road surface, sub-base, and base materials—is hastened.

Defects in road surfaces are typically classified into two categories: surface deterioration and surface deformation. While surface deterioration is related mostly to the quality of the surfacing materials and the way they respond to weather or traffic stresses, surface deformations often have combined causes that include both stresses to the road surface itself and other factors such as sub-base and base capacity and stability. Surface deterioration is exemplified by "dust," the result of loss of fine binder material from road surfaces. Dust is a substantial problem for secondary roads, as the loss of these fine materials leads to other types of road distress such as loss of cohesion and compaction of the road fill material, and reduced capacity to maintain the requisite moisture in the road fill.

Surface deformations include ruts, corrugations, depressions, and potholes. Ruts are longitudinal depressions in the wheel paths caused by high moisture content, inadequate strength in the subsurface soil or base, inadequate surface course thickness, or heavy traffic loads. Corrugating or "washboarding" is a series of ridges and depressions across the road surface caused by lack of surface cohesion. Depressions are localized low areas one or more inches below the surrounding road surfaces that are caused by settlement, excessive moisture content, and/or improper drainage. Potholes are small depressions or voids in the road surface one or more inches deep which are caused by excessive moisture content, poor drainage, weak sub-base or base, poorly graded aggregate, or a combination of these factors.

As such, the problems typically associated with secondary roads—both surface deterioration and deformation—are caused by: 1) the harmful effects of water and high moisture content, including settlement and erosion, on the road surface and base, 2) the lack of surface cohesion and resulting loss of road compaction caused by dust, and 3) the heavy traffic loads exerted on roads with weak or inadequate soil, sub-base, or base. Industry has provided for the addition of various chemical additives to impart water repellency on road materials, with varying degrees of success and environmental impact. However, water repellant chemicals are not binders, and load bearing capacity, stability, and frost resistance are not improved by their application to the soil or road base. In many cases, dust can also be reduced on gravel roads by applying chemical additives (commonly known in the art as "dust suppressors" or "dust retardants") which draw moisture from the air to improve fine aggregate cohesion. And "soil stabilizers," which are chemicals designed to act as binders and coalesce forming bonds between the soil or aggregate particles, have shown promise in greatly improving the load bearing and traffic capacity of the road. But existing soil stabilizers and dust retardants are difficult to apply and use in cold climates, tend to have long cure times, short life-cycles, and do not provide the requisite protection against water damage; particularly excessive moisture content resulting from capillary action.

Repairing damaged roadways by conventional methods can be extremely expensive, time consuming, and environmentally disruptive because the entire compacted gravel layer of the road must be replaced. Excavating the roadbed of a 1-km portion of road measuring 4 m on in width produces about 2000 cubic meters ($m^3$) of earthy waste; in a conventional road bed repair project, this would require roughly 220 truckloads of waste to be removed from the worksite, with 220 truckloads of new gravel being shipped back the worksite to complete the project. In isolated locations, or locations with difficult terrain, the expense of removing and later replacing the gravel is exorbitant—as is the impact on local residents (who must cope with noise and air pollution), normal users of the roadway (who experience detours or extended delays during repair), and the landfills that store the removed waste. Conventional binders are a liquid asphalt, which turns into a black heat-absorbing road surface. At installation a conventional chip sealed surface must be swept resulting in the loss of as much as 20% of the chips installed.

As a result, there is a need in the art for an improved method of building up roads to create strength and longevity, wherein road builders will be able improve the longevity of the roadway, impart increased load bearing and traffic capacity, and reduce the time, costs, and environmental impact associated with conventional road repair projects.

II. SUMMARY

The present stabilization technology offers advantages in a wide variety of road applications from unpaved roads that will remain un-surfaced to roads that will receive running surface treatments. Roadbed stabilization treatments include maximizing potential road strength by blending organic emulsions into native roadbed soils, old graveled roads, or recycled roadway surface materials to create a superior structure that maximizes potential road strength and extends the useful life of the road bed. Midwest's construction system uses in-place soils in conjunction with Midwest's "green" products to engineer improved roadways by stabilizing the sub-base and providing a chip seal running surface—without relying on any asphaltic products. The present inventive components were formulated to be as gentle on the environment as they are effective on the roadway—at only a fraction of the cost. One advantage is the process eliminates the need to import costly base or aggregate materials to build a sub-base for subsequent paving or ship sealing. The inventive components produce lighter surfaces that do not absorb heat, are non-hazardous, non-flammable, non-corrosive, non toxic, use natural products harvested on sustainable basis, will not harm vegetation or wildlife, and will not leach out of the surface so they are safe to use close to streams and bodies of water.

In one embodiment, a composition for road sealing includes an aqueous emulsion of acrylic and vinyl acetate polymer, water, and a resin-modified emulsion, wherein the resin-modified emulsion includes a mixture of pitch and rosin, an emulsifying agent, and water, wherein the composition is substantially free of asphalt.

In another embodiment, the composition includes soil and a binder.

In another embodiment, the composition includes synthetic fibers.

In another embodiment, the acrylic and vinyl acetate polymer are between about 5.0% and about 60.0% by weight, the water is between about 40.0% and about 94.0% by weight, and the resin emulsion between about 1.0% and about 55.0% by weight, wherein within the resin emulsion the pitch is between about 1.0% and about 95% by weight, the rosin is between about 1% to about 70%, the emulsifying agent is between about 0.1% to about 5.0% by weight, and the water is between about 10% to about 98% by weight.

In another embodiment, the composition further includes a tack coat.

In another embodiment, the composition further includes limestone chips.

In another embodiment, the tack coat includes resin-modified emulsion of pitch, rosin, an emulsifying agent, and water, and an aqueous emulsion of acrylic and vinyl acetate polymer.

In another embodiment, the tack coat is an aqueous emulsion.

In another embodiment, the tack coat is an aqueous emulsion and a viscosity enhancer.

In another embodiment, the composition is substantially free of polycyclic organic matter.

In another embodiment, a method for road sealing includes mixing an aqueous emulsion and a resin-modified emulsion with associated native soil to form a road base, applying to the road base a tack coat of aqueous emulsion, adding rock chips to the tack coat, and rolling the tack coat, wherein the composition is substantially free of asphalt.

In another embodiment, the step of applying to the road base a tack coat of aqueous emulsion is applying to the road base a tack coat of about 25% to about 75% by weight resin-modified emulsion and about 25% to about 75% by weight of aqueous emulsion.

In another embodiment, the method includes adding a binder to the road base and adding synthetic fibers to the road base.

In another embodiment, a composition for road sealing includes about 5% to about 95% polymer emulsion by volume, about 5% to about 95% pitch/rosin emulsion by volume, and a tack coat, wherein the composition is substantially free of asphalt.

In another embodiment, the composition includes about 25% polymer emulsion by volume, about 75% pitch/rosin emulsion by volume as a base, the tack coat comprising about 25% thickened polymer emulsion by volume and about 75% pitch/rosin emulsion by volume, wherein no water is added to the tack coat, and a seal coat comprising about 25% thickened polymer emulsion by volume and about 75% pitch/rosin emulsion by volume, wherein the seal coat is diluted 2:1 with water.

In another embodiment, the composition further includes a rheology modifier.

In another embodiment, the rheology modifier is chosen from the group comprising naturally occurring gums, polyacrylamide polymers, methylcellulose, silicas, and carbonates.

In another embodiment, the composition further includes a drying aid.

In another embodiment, the drying aid is chosen from the group comprising surfactants, linseed oil, walnut oil, corn oil, tong oil, poppy oil, perilla oil, cotton oil, and alcohols.

In another embodiment, the composition further includes a curing agent or accelerator.

In another embodiment, the curing agent or accelerator is chosen from the group comprising various binders/hardeners including, but not limited to, hydraulic curing agent and non-hydraulic curing agent.

In another embodiment, a method for road sealing includes applying a tack coat directly on an associated asphalt road, wherein the tack coat is chosen from the group consisting of aqueous emulsion, resin-modified emulsion, mixture of aqueous emulsion and resin-modified emulsion, aqueous emulsion and viscosity enhancer, resin-modified emulsion with viscosity enhancer, and mixture of aqueous emulsion and resin-modified emulsion with viscosity enhancer.

In another embodiment, the method further includes mixing the curing agent or accelerator into the native soil or road bed material prior to the application of the aqueous emulsion or resin-modified emulsion.

In another embodiment, the method further includes the addition of the curing agent or accelerator to the aqueous emulsion or resin-modified emulsion prior to application into, or onto, the native soil or road bed.

In another embodiment, the method further includes mixing an aqueous emulsion and a resin-modified emulsion with associated native soil to form a road base, applying to the road base a tack coat of aqueous emulsion, adding rock chips to the tack coat, wherein the chips are not washed prior to use, and rolling the tack coat.

Other benefits and advantages will become apparent to those skilled in the art to which it pertains upon reading and understanding of the following detailed specification.

III. BRIEF DESCRIPTION OF THE DRAWINGS

The invention may take physical form in certain parts and arrangement of parts, at least one embodiment of which will be described in detail in this specification and illustrated in the accompanying drawings which form a part hereof and wherein.

IV. DETAILED DESCRIPTION

Figure 2:
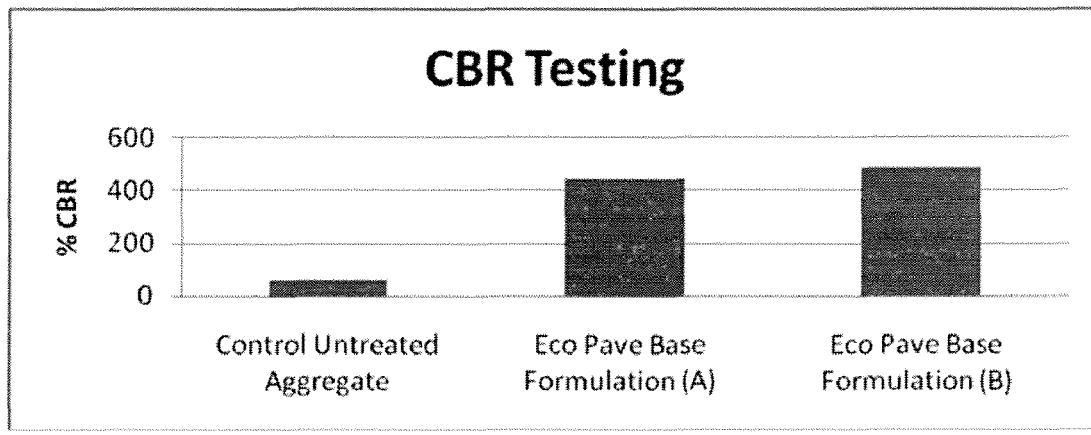
FIG. 2 shows a comparative chart of CBR testing.
Figure 3:
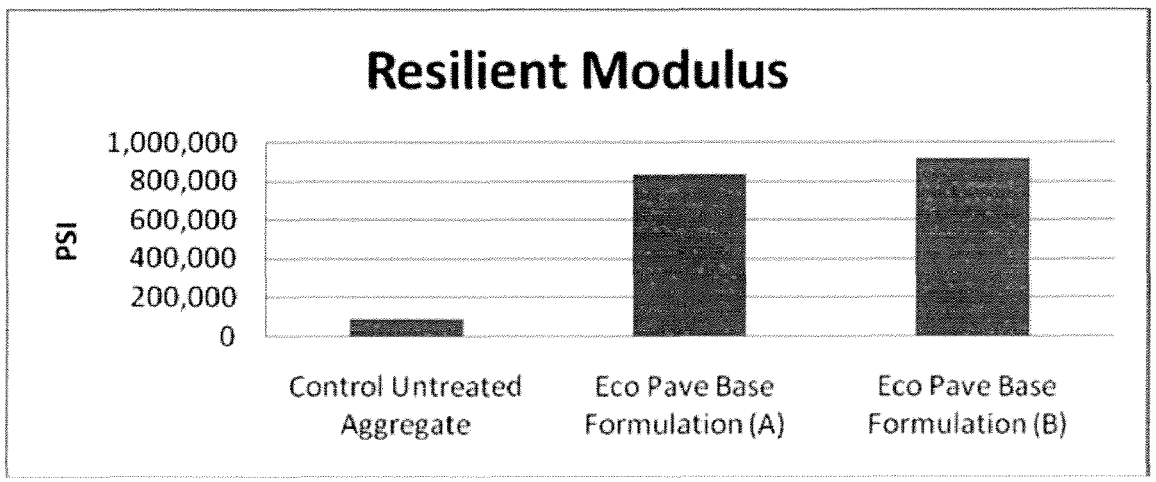
FIG. 3 shows a comparative chart of resilient modulus.

In FIGS. 2 and 3 the Resilient Modulus was calculated based on the CBR values according to the Relationship: Mr (psi)=1500 CBR. Formulation A is (a) 67% by weight percent based upon the total weight of the emulsion a mixture comprising pitch, rosin, an emulsifying agent, and water; (b) 33% acrylic and vinyl acetate polymer and water; and (c) chip sealed with acrylic and vinyl acetate polymer and water. Formulation B is (a) 67% by weight percent based upon the total weight of the emulsion a mixture comprising pitch, rosin, an emulsifying agent, and water; (b) 33% acrylic and vinyl acetate polymer and water; and (c) chip sealed with thickened acrylic and vinyl acetate polymer and water.

In one embodiment of the present invention, the characteristics of the composition for road base materials can include a composition that is an aqueous emulsion comprising about 5.0% to about 60.0% by weight (including, but not limited to, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 and 60) of acrylic and vinyl acetate polymer, and 40.0% to about 95.0% by weight (including, but not limited to, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, and 95) of water. In this embodiment, this aqueous emulsion is combined with a resin-modified emulsion (described in U.S. Pat. No. 4,822,425, which is incorporated herein by reference) which comprises from (a) about 1 to about 90 weight percent based upon the total weight of said emulsion of a mixture comprising pitch from about 5 to about 95 weight percent (including, but not limited to, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, and 95) based on the total weight of the mixture and rosin from to 70 weight percent (including, but not limited to, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, and 70) based on the total weight of the mixture; (b) from about 0.1 to 5.0 weight percent (including, but not limited to, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, and 5.0) based upon the total weight of said emulsion of an emulsifying agent and (c) from about 9.9 to 98 weight percent (including, but not limited to, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, and 98) based upon the total weight of the emulsion of water.

When the term "water insoluble" is used herein, it is meant that the mixture of pitch and rosin when dispersed onto the aggregate material after the water has evaporated will not be washed away by rainwater and the like thereby weakening the final product. As mentioned, the oil base dust control products do not adhere or bind themselves to the aggregate but are water soluble and do wash away with the rain. When the term "non-flammable" is used herein it is meant that the mixture or the emulsion will not catch fire instantly when exposed to a spark or flame and will not burn rapidly or continuously. When the term "non-corrosive" is used herein it is meant that the mixture of emulsion has a neutral pH. Consequently, it will not rust or corrode metals. Many of the dust control agents of the prior art are chloride based, such as, magnesium chloride and calcium chloride which are corrosive. When the term "emulsion" or "pine tar emulsion" is used herein it is meant that the mixture of pitch and rosin has been emulsified in water using an emulsifying agent. The water being the continuous phase and the mixture of pitch and rosin being the dispersed phase. Standard emulsifying technology is used to produce the emulsion of the instant invention. Any standard emulsifying unit can be used that will produce a maximum particle size in the pitch and rosin phase of from about 5 to 10 microns (including, but not limited to, 5, 6, 7, 8, 9, and 10). When the term "stabilizing" is used herein in the context of stabilizing aggregate, it is meant that when aggregate is applied to roadways and the like, the aggregate is held into place forming a solid paving material such that even through the paving material is subjected to heavy traffic such as automobiles and heavy trucks, freezing and thawing, wind and rain, erosion, etc., the material will remain unchanged. When the term "aggregate" is used herein, it is meant to refer to materials, such as, granular rock particles, shale or similar materials with similar hardness and inertness either natural or manufactured, and either in situ or imported. When the term "pitch" is used herein, it is meant to refer to pine tar pitch which is the residue obtained from a "distillation column" in the paper producing process. When the word "rosin" is used herein, it is meant to mean the rosin as defined in the Condensed Chemical Dictionary, 9th Edition, published by Van Nostrand Reinhold Co., 1977, page 756.

When the term "pliable" is used herein it is meant that the stabilized aggregate will not break up under the maximum allowable highway axle weights of vehicles traveling on these roadways paved with the stabilized aggregate. When the term "water impermeable" is used herein it is meant that the stabilized aggregate is waterproof and will actually shed water. When the term "weight supporting" is used herein it is meant that the stabilized aggregate is bound together sufficiently to withstand stress and pressures associated with heavy vehicles traveling on roadways. When the term "repairable" is used herein, it is meant that the stabilized aggregate is easily repaired, as compared to asphalt where certain asphalt patching material tends to be easily removed from "pot holes." When the term "stable" is used herein to describe the instant emulsion, it is meant to mean that the continuous water phase of the emulsion will not separate from the pitch/rosin phase of the emulsion for at least 1 month. When the terms "stable" or "stabilized" are used herein to describe the instant stabilized aggregate material, it is meant that the pitch/rosin coating on the aggregate will not re-emulsify or "plate out" after compaction of the aggregate and after the water has evaporated. This stabilized aggregate material will remain stable even when exposed to large amounts of water such as heavy rains. If this material was not stable, the pitch/rosin would re-emulsify resulting in the material becoming soft and non-weight supporting. When the term "solid material" is used herein, it is meant to describe the stabilized aggregate after it has formed a "block" of material or has formed a roadway surface, etc. When the term "freeze resistant" is used herein, it is meant that the stabilized aggregate may be subjected to freezing and thawing temperatures without affecting the strength or weight supporting capability of the stabilized aggregate. When the term "dilutable" is used herein, it is meant that the concentrated emulsion is capable and may be diluted with water, e.g., 1 to 30 parts water to 1 part emulsions, to form a product which is easily mixed with aggregate to provide a "pothole" or crack patching material or it may be sprayed to seal asphalt, concrete or other paved surfaces, etc. When the term "emulsifying agent" is used herein, it is meant to mean that it will facilitate the formation of an emulsion. An emulsion as defined herein or as used herein, is defined in the Condensed Chemical Dictionary 9th Edition, page 340. Any suitable emulsifying agent may be used. Emulsifiers may be anionic, cationic or nonionic. A large number of such emulsifying agents are well known in the emulsion art. Anionic emulsifiers include soaps, such as, the alkali metal soaps of fatty acids, rosin acids, tolyl acids, alkaryl sulfonic acids, and the like. Cationic emulsifying agents include aliphatic amines, aromatic amines with fatty acid chains, fatty amides quaternary ammonium salts, polyethylene diamines and their quaternary ammonium derivatives, alkyl imidazolines and the like. Nonionic emulsifying agents include polyoxyethylene derivative of alcohols, acids, ethers, phenols, amides, or amines.

When the term "binder/hardner" is used herein, it is meant a substance that sets and hardens and can bind materials together and accelerates the curing process. When the term "hydraulic curing agent" is used herein, it is meant a substance that cures due to hydration or a chemical reaction independent of water content. When the term "non-hydraulic curing agent" is used herein, it is meant a substance that must be kept dry during the curing process.

In several embodiments of the present invention, methods for improving soil or road base materials are provided. As used in this patent application, the term "soil" is broadly used to describe the top layer of the earth's surface, consisting of rock and mineral particles mixed with organic matter (also known as, by non-limiting reference, earth or dirt); whether originally located at the road construction site ("native soil" or "in situ soil") or transported to the road construction site. As used in this patent application, the phrase "road base materials" is broadly used to describe any substance from which a road surface, base, or sub-base could be constructed; including, but certainly not limited to by this non-limiting reference, rock, broken rock, gravel (whether pebble, granule, or other size or mixture), sand, cobble, slag, or other construction aggregate or fill material. The manner of composition application can include any method chosen with sound engineering judgment; but in most instances, application of the chemical agent to the soil is accomplished by the use of conventional spray equipment (spray trucks). The agent is gravity fed or pumped through hoses, spray nozzles, or fixed sprayers and evenly applied to the soil or material to be treated.

In one embodiment, a road base is built of the aqueous emulsion and resin-modified emulsion mixed with the native soil. In one embodiment the road base is about four inches deep. In another embodiment, a binder (i.e. Portland cement) can be added to the road base. In another embodiment, synthetic fibers can be added to the base as well. In one embodiment, a tack coat of about 25% by weight to about 75% by weight (including, but not limited to, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, and 75) of the resin-modified emulsion and about 25% by weight to about 75% by weight (including, but not limited to, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, and 75) of the aqueous emulsion can be added to the road base. After the tack coat is applied, chips of limestone are added to the tack coat, which is then rolled with a pneumatic roller, and then rolled with a steel drum. In this embodiment, no asphalt is used to build the road, and the product is substantially free of polycyclic organic matter, including polynuclear aromatic hydrocarbons. It is to be understood that the tack coat could also be just the aqueous emulsion. It is also to be understood that the tack coat could be a combination of the aqueous emulsion and a viscosity enhancer.

In another embodiment, composition includes about 25% polymer emulsion (either thickened or unthickened) by volume and about 75% pitch/rosin emulsion by volume as a base. The base is diluted to achieve optimum moisture. The chip contains a tack coat which is about 25% thickened polymer emulsion by volume and about 75% pitch/rosin emulsion by volume, wherein no water is added to the tack coat, and a seal coat which is the composition as the tack coat, except that it is diluted 2:1 with water. The invention can be used as a base alone, a surface alone, both base and surface, chip over existing asphalt roads, as well as chip over existing stable native soil roads. In several embodiments, the aggregate can be chosen from the group comprising in situ soils, reclaimed asphalt, reclaimed concrete, limestone, river rock, granite, decomposed granite, and any combination of the above aggregates. The aggregate can be either washed or unwashed.

In one embodiment Marshall Stability testing was performed in accordance to ASTM D 6927 on several formulations, with the range of results being 4,450 lbs to 12,490 lbs. The CBR testing was conducted in accordance with ASTM D1883-99. The aggregate material was sieved in accordance to ASTM D422. The aggregate was classified through USCS (Unified Soil Classification System) as SP-poorly-graded sand; $\geq$50% of coarse fraction passes No. 4 sieve; through AASHTO (American Association of State Highway and Transportation Officials) as A-1-b material=General rating as a subgrade is excellent to good. The optimum moisture was determined to be 7.2% calculated in accordance to ASTM D 1557.

The road base can be made of native soil combined with the aqueous emulsion, the native soil combined with the resin-modified emulsion, or the native soil combined with the aqueous emulsion and the resin-modified emulsion. In one embodiment of this invention, the chips do not need to be washed prior to use.

In another embodiment, the tack coat can be applied directly to an asphalt road as well. In this embodiment, the tack coat, which can be the aqueous emulsion, the resin-modified emulsion, the aqueous emulsion/resin-modified emulsion, or any of the previous combined with a viscosity enhancer. To this tack coat can be added the chips as described above.

In one embodiment, the treated soil or road base materials are graded and compacted, using any means chosen with sound engineering judgment, and a top coat of the composition is applied. Motor-graders, asphalt grinders, mixers, pug mills, compactors, rollers, and other conventional construction equipment may be utilized to blend, set grade, and compact stabilized base, if necessary, as described in herein. A top coat is defined broadly as any application of the soil or road base materials chemical improvement composition that is applied after compaction.

Figure 4:
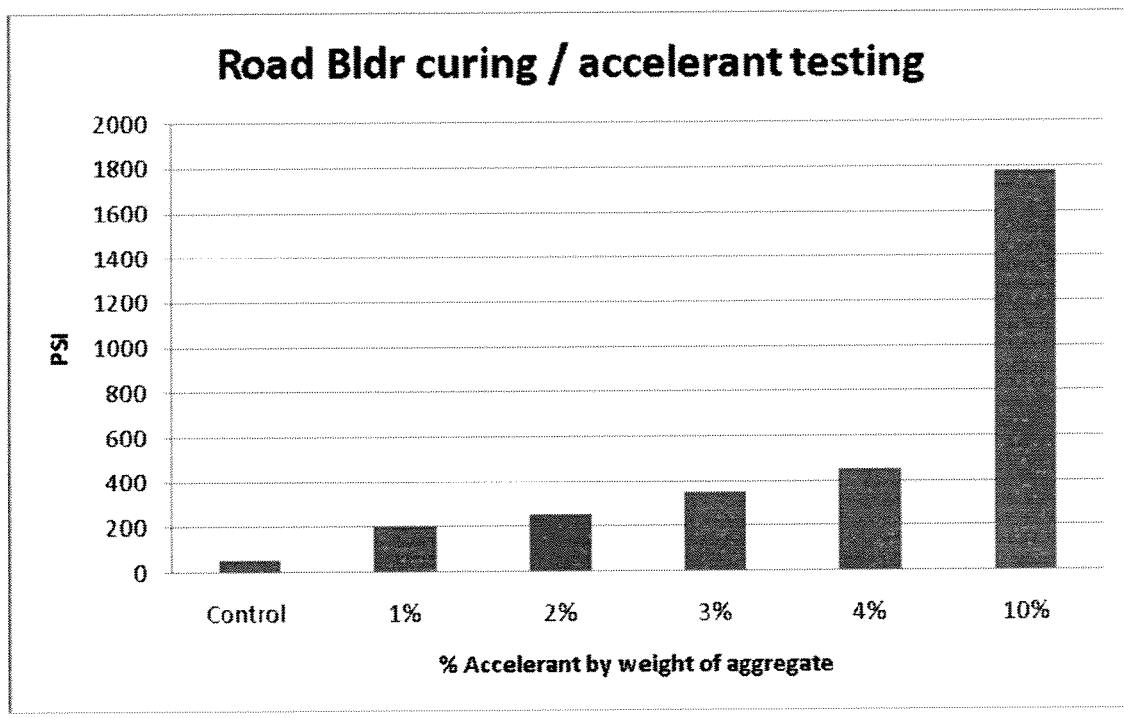
FIG. 4 shows a chart showing the increase in pressure withstood by the composition.

In another embodiment, the composition includes a curing agent. The curing agent allows the road or road base to be open to traffic or use in a matter of hours rather than days. The curing agent increases the early strength of the surface without compromising the late or long term strength. The curing agent allows for rapid attainment of residual moisture levels and allows installation in conditions of less than ideal moisture. The curing agent is exothermic, allowing for use in less then ideal temperatures normally needed for emulsion drying and curing. With reference now to FIG. 4, the graph shows increase in pressure withstood with the increased percentage of curing agent mixed with the aggregate ("native soil"). Unconfined compressive strength (UCS) tests were used. The curing agent used in the testing of FIG. 4 was a non-Portland hydraulic binder, and in this particular example was Ciment Fondu®, available from Kerneos SA, Seine, France. Ciment Fondu® has a chemical composition of 37.5% to 41.0% by weight $Al_2O_3$, 35.5% to 39.0% by weight CaO, 3.5% to 5.5% $SiO_2$, 13.0% to 17.5% $Fe_2O_3$, less than 1.5% MgO, and less than 4.0% $TiO_2$. In another embodiment, the curing agent comprises greater than 37.0% $Al_2O_3$, less than 41.0% CaO, less than 6.0% $SiO_2$, less than 18.5% $Fe_2O_3$, less than 1.5% MgO, and less than 4.0% $TiO_2$. In another embodiment, the curing agent can be aluminum silicate. When the curing agent is added to the soil, the curing agent is approximately 0.1% to approximately 20.0% by weight of the soil (including, but not limited to 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, 14.0, 14.1, 14.2, 14.3, 14.4, 14.5, 14.6, 14.7, 14.8, 14.9, 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18.0, 18.1, 18.2, 18.3, 18.4, 18.5, 18.6, 18.7, 18.8, 18.9, 19.0, 19.1, 19.2, 19.3, 19.4, 19.5, 19.6, 19.7, 19.8, 19.9, and 20.0.) When the curing agent is added to the emulsion, the curing agent is approximately 0.1% to approximately 30.0% by weight (including, but not limited to 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, 14.0, 14.1, 14.2, 14.3, 14.4, 14.5, 14.6, 14.7, 14.8, 14.9, 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18.0, 18.1, 18.2, 18.3, 18.4, 18.5, 18.6, 18.7, 18.8, 18.9, 19.0, 19.1, 19.2, 19.3, 19.4, 19.5, 19.6, 19.7, 19.8, 19.9, 20.0, 20.1, 20.2, 20.3, 20.4, 20.5, 20.6, 20.7, 20.8, 20.9, 21.0, 21.1, 21.2, 21.3, 21.4, 21.5, 21.6, 21.7, 21.8, 21.9, 22.0, 22.1, 22.2, 22.3, 22.4, 22.5, 22.6, 22.7, 22.8, 22.9, 23.0, 23.1, 23.2, 23.3, 23.4, 23.5, 23.6, 23.7, 23.8, 23.9, 24.0, 24.1, 24.2, 24.3, 24.4, 24.5, 24.6, 24.7, 24.8, 24.9, 25.0, 25.1, 25.2, 25.3, 25.4, 25.5, 25.6, 25.7, 25.8, 25.9, 26.0, 26.1, 26.2, 26.3, 26.4, 26.5, 26.6, 26.7, 26.8, 26.9, 27.0, 27.1, 27.2, 27.3, 27.4, 27.5, 27.6, 27.7, 27.8, 27.9, 28.0, 28.1, 28.2, 28.3, 28.4, 28.5, 28.6, 28.7, 28.8, 28.9, 29.0, 29.1, 29.2, 29.3, 29.4, 29.5, 29.6, 29.7, 29.8, 29.9, and 30.0).

In one embodiment of the present invention, the characteristics of the composition for road base materials can include a composition that is an aqueous emulsion comprising about 5.0% to about 60.0% by weight (including, but not limited to, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 and 60) of acrylic and vinyl acetate polymer, about 0.1% to about 30.0% by weight (including, but not limited to 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, 14.0, 14.1, 14.2, 14.3, 14.4, 14.5, 14.6, 14.7, 14.8, 14.9, 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18.0, 18.1, 18.2, 18.3, 18.4, 18.5, 18.6, 18.7, 18.8, 18.9, 19.0, 19.1, 19.2, 19.3, 19.4, 19.5, 19.6, 19.7, 19.8, 19.9, 20.0, 20.1, 20.2, 20.3, 20.4, 20.5, 20.6, 20.7, 20.8, 20.9, 21.0, 21.1, 21.2, 21.3, 21.4, 21.5, 21.6, 21.7, 21.8, 21.9, 22.0, 22.1, 22.2, 22.3, 22.4, 22.5, 22.6, 22.7, 22.8, 22.9, 23.0, 23.1, 23.2, 23.3, 23.4, 23.5, 23.6, 23.7, 23.8, 23.9, 24.0, 24.1, 24.2, 24.3, 24.4, 24.5, 24.6, 24.7, 24.8, 24.9, 25.0, 25.1, 25.2, 25.3, 25.4, 25.5, 25.6, 25.7, 25.8, 25.9, 26.0, 26.1, 26.2, 26.3, 26.4, 26.5, 26.6, 26.7, 26.8, 26.9, 27.0, 27.1, 27.2, 27.3, 27.4, 27.5, 27.6, 27.7, 27.8, 27.9, 28.0, 28.1, 28.2, 28.3, 28.4, 28.5, 28.6, 28.7, 28.8, 28.9, 29.0, 29.1, 29.2, 29.3, 29.4, 29.5, 29.6, 29.7, 29.8, 29.9, and 30.0) of curing agent, and 10.0% to about 94.9% by weight (including, but not limited to, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, and 94.9) of water. In this embodiment, this aqueous emulsion is combined with a resin-modified emulsion (described in U.S. Pat. No. 4,822,425, which is incorporated herein by reference) which comprises from (a) about 1 to about 90 weight percent based upon the total weight of said emulsion of a mixture comprising pitch from about 5 to about 95 weight percent (including, but not limited to, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, and 95)

based on the total weight of the mixture and rosin from 1 to 70 weight percent (including, but not limited to, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, and 70) based on the total weight of the mixture; (b) from about 0.1 to 5.0 weight percent (including, but not limited to, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.3, 2.4, 2.5, 2.6, 2.7, 2.8, 2.9, 3.0, 3.1, 3.2, 3.3, 3.2, 3.4, 3.5, 3.6, 3.7, 3.8, 3.9, 4.0, 4.1, 4.2, 4.3, 4.4, 4.5, 4.6, 4.7, 4.8, 4.9, and 5.0) based upon the total weight of said emulsion of an emulsifying agent and (c) from about 9.9 to 98 weight percent (including, but not limited to, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, and 98) based upon the total weight of the emulsion of water.

In one embodiment of the present invention, the characteristics of the composition for road base materials can include a composition that is an aqueous emulsion comprising about 5.0% to about 60.0% by weight (including, but not limited to, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 and 60) of acrylic and vinyl acetate polymer and 40.0% to about 95% by weight (including, but not limited to, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, and 95) of water. In this embodiment, this aqueous emulsion is combined with a resin-modified emulsion (described in U.S. Pat. No. 4,822,425, which is incorporated herein by reference) which comprises from (a) about 1 to about 90 weight percent based upon the total weight of said emulsion of a mixture comprising pitch from about 5 to about 95 weight percent (including, but not limited to, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, and 95) based on the total weight of the mixture and rosin from 1 to 70 weight percent (including, but not limited to, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, and 70) based on the total weight of the mixture; (b) from about 0.1 to 5.0 weight percent (including, but not limited to, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, and 5.0) based upon the total weight of said emulsion of an emulsifying agent (c) from about 9.8 to 98 weight percent (including, but not limited to, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, and 98) based upon the total weight of the emulsion of water, and (d) from about 0.1 to 30.0 weight percent (including, but not limited to 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, 14.0, 14.1, 14.2, 14.3, 14.4, 14.5, 14.6, 14.7, 14.8, 14.9, 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18.0, 18.1, 18.2, 18.3, 18.4, 18.5, 18.6, 18.7, 18.8, 18.9, 19.0, 19.1, 19.2, 19.3, 19.4, 19.5, 19.6, 19.7, 19.8, 19.9, 20.0, 20.1, 20.2, 20.3, 20.4, 20.5, 20.6, 20.7, 20.8, 20.9, 21.0, 21.1, 21.2, 21.3, 21.4, 21.5, 21.6, 21.7, 21.8, 21.9, 22.0, 22.1, 22.2, 22.3, 22.4, 22.5, 22.6, 22.7, 22.8, 22.9, 23.0, 23.1, 23.2, 23.3, 23.4, 23.5, 23.6, 23.7, 23.8, 23.9, 24.0, 24.1, 24.2, 24.3, 24.4, 24.5, 24.6, 24.7, 24.8, 24.9, 25.0, 25.1, 25.2, 25.3, 25.4, 25.5, 25.6, 25.7, 25.8, 25.9, 26.0, 26.1, 26.2, 26.3, 26.4, 26.5, 26.6, 26.7, 26.8, 26.9, 27.0, 27.1, 27.2, 27.3, 27.4, 27.5, 27.6, 27.7, 27.8, 27.9, 28.0, 28.1, 28.2, 28.3, 28.4, 28.5, 28.6, 28.7, 28.8, 28.9, 29.0, 29.1, 29.2, 29.3, 29.4, 29.5, 29.6, 29.7, 29.8, 29.9, and 30.0) based upon the o a weight of the emulsion of a curing agent.

Figure 1:
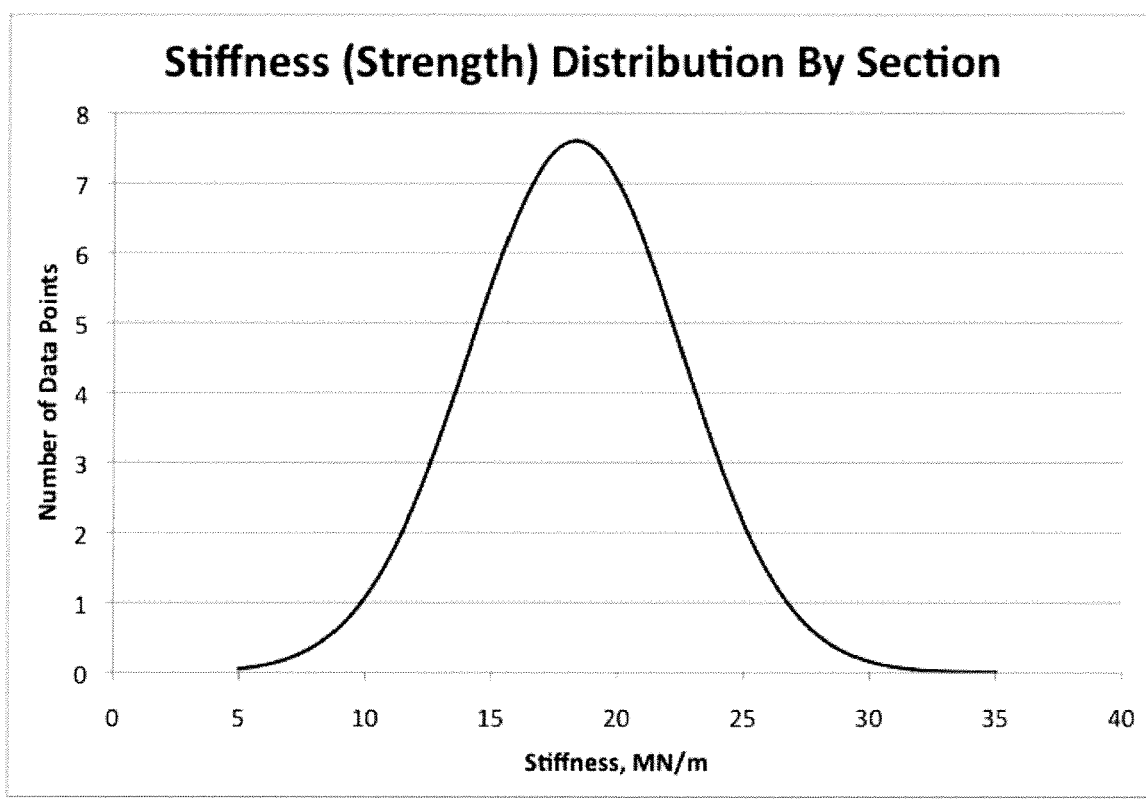
FIG. 1 shows a chart of the Samitron stiffness measurements of one embodiment wherein a chip seal is approximately ½" thick and the Samitron depth of measurement is approximately 9"

With reference to FIG. 1, the Samitron stiffness measurements of one embodiment represent the stabilized soil as the chip seal is approximately ½ inch thick and the Samitron depth measurement is about 9 inches. This performance is comparable to that of the best quality aggregate bases used for interstate highway construction. This shows that the present invention will perform at least as well as a moderate volume road and excellent as a parking lot. FIG. 1 represents approximately ½ inch of a chip seal over top of native soil mixed with the present invention.

In a listing of potential embodiments, the following chemical combinations are potential embodiments (all percentages are based on weight of the emulsion, the emulsions are between about 20% to about 65% by weight of active ingredient): polymer emulsion at about 100% by weight; pitch/rosin emulsion at about 100% by weight; thickened polymer emulsion at about 100% by weight; polymer emulsion (about 5% to about 95%) with pitch/rosin emulsion (about 5% to about 95%); and thickened polymer emulsion (about 5% to about 95%) with pitch/rosin emulsion (about 5% to about 95%). In several embodiments rheology modifiers (thickeners) may be used. The rheology modifier can be chosen from the group comprising naturally occurring gums (i.e. xanthan gum, guar gum), polyacrylamide polymers, methylcellulose, silicas, and carbonates. In several embodiments, drying aids are used. The drying aid can be chosen from the group comprising surfactants (i.e. alpha olefin sulfonates, sodium lauryl sulfonates, sodium dioctylsulfosuccinate), linseed oil, walnut oil, corn oil, tong oil, poppy oil, perilla oil, cotton oil, and alcohols (i.e. methanol, isopropyl alcohol).

The embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof. Although the description above contains much specificity, this should not be construed as limiting the scope of the invention, but as merely providing illustrations of some of the presently preferred embodiments of this invention. Various other embodiments and ramifications are possible within its scope. Furthermore, notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Having thus described the invention, it is now claimed:

1. A composition for road sealing, the composition comprising:
   an aqueous emulsion of acrylic and vinyl acetate polymer and water; and,
   a resin-modified emulsion, wherein the resin-modified emulsion comprises:
      a mixture of pitch and rosin;
      an emulsifying agent; and,
      water, wherein the composition is substantially free of asphalt, wherein the composition is water insoluble when dispersed on aggregate material.

2. The composition of claim 1, herein the composition further comprises:
   soil;
   synthetic fibers; and,
   a binder.

3. The composition of claim 1, wherein the aqueous emulsion is about 33.0% by weight and the resin emulsion is about 67.0% by weight.

4. The composition of claim 1, wherein the aqueous emulsion is thickened.

5. The composition of claim 1, wherein the aqueous emulsion is unthickened.

6. The composition of claim 1, wherein the composition further comprises:
   a tack coat.

7. The composition of claim 6, wherein the composition further comprises:
   limestone chips.

8. The composition of claim 6, wherein the tack coat comprises:
   resin-modified emulsion of pitch, rosin, an emulsifying agent, and water: and,
   an aqueous emulsion of acrylic and vinyl acetate polymer.

9. The composition of claim 6, wherein the tack coat comprises an aqueous emulsion.

10. The composition of claim 6, wherein the tack coat comprises:
    an aqueous emulsion; and,
    a viscosity enhancer.

11. The composition of claim 1, wherein the composition is substantially free of polycyclic organic matter.

12. The composition of claim 1, wherein the composition further comprises a curing agent.

13. The composition of claim 1, wherein the composition absorbs heat, is non-hazardous, non-flammable, non-corrosive, non-toxic, and contains substantially no chloride.

14. A method for road sealing, the method comprising the steps of:
    mixing an aqueous emulsion and a resin-modified emulsion with associated native soil to form a road base:
    grading and compacting the road base;
    applying to the road base a tack coat of aqueous emulsion;
    adding rock chips to the tack coat; and,
    rolling the tack coat, wherein the composition is substantially free of asphalt, wherein the aqueous emulsion is an acrylic and vinyl acetate polymer and water, and the resin-modified emulsion is pitch, rosin, emulsifying agent, and water.

15. The method of claim 14, wherein the tack coat is a mixture of aqueous emulsion and a viscosity enhancer.

16. The method of claim 14, wherein the step of applying to the road base a tack coat of aqueous emulsion, comprises:
    applying to the road base a tack coat of about 25% to about 75% by weight resin-modified emulsion and about 25% to about 75% by weight of aqueous emulsion.

17. The method of claim 16, wherein method comprises the steps of:
    adding a binder to the road base; and,
    adding synthetic fibers to the road base.

18. The method of claim 16, wherein no polycyclic organic matter is used.

19. The method of claim 14, wherein prior to the step of mixing an aqueous emulsion and a resin-modified emulsion with associated native soil to form a road base, the method comprises the step of:
    mixing a curing agent with associated native soil.

20. The method of claim 14, wherein the road base is water insoluble after application of the emulsions.

\* \* \* \* \*